(12) United States Patent
Suwa

(10) Patent No.: US 7,409,152 B2
(45) Date of Patent: Aug. 5, 2008

(54) THREE-DIMENSIONAL IMAGE PROCESSING APPARATUS, OPTICAL AXIS ADJUSTING METHOD, AND OPTICAL AXIS ADJUSTMENT SUPPORTING METHOD

(75) Inventor: Masaki Suwa, Kyoto (JP)

(73) Assignee: Omron Corporation, Kyoto (JP)

( * ) Notice: Subject to any disclaimer, the term of this patent is extended or adjusted under 35 U.S.C. 154(b) by 508 days.

(21) Appl. No.: 11/167,944

(22) Filed: Jun. 27, 2005

(65) Prior Publication Data
US 2006/0008268 A1  Jan. 12, 2006

(30) Foreign Application Priority Data
Jul. 2, 2004  (JP) ............................. 2004-197061

(51) Int. Cl.
*G03B 17/24* (2006.01)
*G03B 35/00* (2006.01)
*G03B 21/00* (2006.01)
*G03B 27/22* (2006.01)

(52) U.S. Cl. ........................ 396/310; 396/324; 353/121; 352/57; 359/462

(58) Field of Classification Search ................. 396/310, 396/324; 353/7, 10, 30, 121; 359/462; 348/187; 378/41, 162; 352/57, 90; 600/109, 117, 600/424, 443; 128/922; 101/485
See application file for complete search history.

(56) References Cited

U.S. PATENT DOCUMENTS 6,471,355 B1 * 10/2002 Monson et al. ............... 353/30

* cited by examiner

*Primary Examiner*—Melissa Jan Koval
(74) *Attorney, Agent, or Firm*—Osha Liang LLP

(57) ABSTRACT

The present invention provides a technique for enabling even a person having no expert knowledge to adjust the direction of an optical axis easily with high precision. In a three-dimensional image processing apparatus having plural image capturing apparatuses, optical center of an image from an image capturing apparatus is stored for each of the image capturing apparatuses. A mark indicative of the optical center is superimposed on an image obtained from the image capturing apparatus. By referring to the mark for each of the image capturing apparatuses, the orientation of each of the image capturing apparatuses is adjusted so that all of the marks overlay on the same point on an object.

11 Claims, 9 Drawing Sheets

| Focal distance | First image capturing apparatus | Second image capturing apparatus |
|---|---|---|
| A | X1a, Y1a | X2a, Y2a |
| B | X1b, Y1b | X2b, Y2b |
| C | X1c, Y1c | X2c, Y2c |

THREE-DIMENSIONAL IMAGE PROCESSING APPARATUS, OPTICAL AXIS ADJUSTING METHOD, AND OPTICAL AXIS ADJUSTMENT SUPPORTING METHOD

BACKGROUND OF THE INVENTION

1. Field of the Invention

The present invention relates to a three-dimensional image processing apparatus for obtaining three-dimensional information of an object from stereoscopic images captured by plural image capturing apparatuses and, more particularly, to a technique for adjusting directions of optical axes of the image capturing apparatuses.

2. Description of the Related Art

One of the methods of obtaining three-dimensional information of an object from images is a method of capturing images of a predetermined image capture area by plural image capturing apparatuses disposed at predetermined intervals and obtaining corresponding relations of image formation points of the object on the captured plural images among the image capturing apparatuses. This method is generally called a stereo image process.

In a three-dimensional image processing apparatus using the stereo image process, the optical axes of image capturing apparatuses are set to be parallel with each other, or the optical axes are set so as to cross each other. The latter case has an advantage such that a common visual field of the image capturing apparatuses is easily assured, and is effective, for example, when it is necessary to set the distance between image capturing apparatuses to be smaller than the width of the image capturing apparatus itself, and when the distance between the image capturing apparatus and an object is small. In addition, when the optical axes cross each other, there are advantages such that (1) estimation precision of a parameter describing geometrical arrangement between the image capturing apparatuses is stabilized, (2) since the parallax of an object projected in the vicinity of a center of an image becomes close to zero, the cost of parallax calculation can be reduced, and the like.

Although "crossing" has various advantages as described above, in reality, the optical axes are not seen, so that it is very difficult to adjust the directions of the optical axes of image capturing apparatuses. It is all the more difficult for the user having no expert knowledge of image processing.

The conventional technique has an attempt to perform a method of automatically adjusting an optical axis on the basis of correlation between center portions of images on the assumption that fixation points on the optical axes gather in the center of an image pickup device (that is, the optical axis passes the center of the image pickup device).

In the actual image capturing apparatus, however, there is no guarantee that the optical axis passes the center of the image pickup device due to mount variations of the image pickup device and an optical system (refer to FIG. 13). Moreover, there is also the possibility that a deviation amount between the passing point of the optical axis in the image pickup device (the optical center of the image) and the center of the image pickup device (the center of the image) changes when the focal distance changes. In the case where a center portion of an image does not include a characteristic image point and in the case where a similar pattern repeatedly appears in an image, erroneous correspondence between images may occur. Therefore, the precision of optical axis adjustment in the conventional technique is limited.

SUMMARY OF THE INVENTION

The present invention has been achieved in view of the circumstances and an object of the invention is to provide a technique for enabling even a person having no expert knowledge to adjust the direction of an optical axis easily with high precision.

To achieve the object, in the present invention, information corresponding to an optical axis of an image capturing apparatus or a fixation point on the optical axis is visualized, and the visualized image is used as reference information for adjustment of the direction of the optical axis.

Concretely, according to an aspect of the present invention, a three-dimensional image processing apparatus for obtaining three-dimensional information of an object from plural images, includes: plural image capturing apparatuses; a storage for storing optical center of an image captured by each of the image capturing apparatuses for each of the image capturing apparatuses; and a display for displaying a mark indicative of the optical center so as to be superimposed on the image captured by the image capturing apparatus.

The "optical center of an image" corresponds to the meeting point of an optical axis and an image pickup device of the image capturing apparatus, and the "mark indicative of optical center" corresponds to a mark obtained by visualizing information corresponding to the optical axis or a fixation point on the optical axis. Consequently, the user can visually grasp the direction of the image capturing apparatus by seeing an image displayed on the display. Thus, even if the "optical center of an image" and the "center of the image" do not match each other, by referring to marks of the image capturing apparatuses, the directions of the optical axes can be adjusted with high precision, and crossing of the optical axes can be realized relatively easily. For example, in the case of performing adjustment manually, it is sufficient to adjust the orientations of the image capturing apparatuses so that all of marks overlay the same point on an object by seeing the marks of the image capturing apparatuses. Obviously, the processor can automatically adjust the orientation of the image capturing apparatuses on the basis of the marks.

When the image capturing apparatus has plural focal distances, it is preferable to store optical center of an image at each of the focal distances in the storage. When the focal distance changes, there is the possibility that the position of the optical center of the image changes. By properly switching information read from the storage in accordance with the focal distance of the image capturing apparatus, a mark can be displayed always in a proper position. Therefore, precision of the optical axis adjustment can be improved.

It is also preferable that the display enlargedly displays a part including the mark. By seeing an enlarged image, fine adjustment and matching of the direction of the optical axis can be performed with high precision.

There are various display modes of images and marks. First, a mode of displaying an image on which a mark is superimposed for each of the image capturing apparatuses is assumed. In this case, it is sufficient to adjust the orientation of each of the image capturing apparatuses so that marks on images overlay the same point on an object.

Second, a mode of superimposing marks of plural image capturing apparatuses on a single image is assumed. For example, the display superimposes, on a first image obtained from a first image capturing apparatus, a first mark indicative of optical center of the first image and a second mark indicative of information that optical center of a second image obtained from a second image capturing apparatus is projected onto the first image. The second mark projected onto the first image may indicate a correspondence point of an image in the optical center of the second image or an epipolar line of the optical axis of the second image capturing apparatus, projected onto the first image.

It is also preferable that the display displays the difference between the positions of the first and second marks. For example, a distance on an image and an adjustment amount of the image capturing apparatus are information useful for optical axis adjustment.

The present invention is also directed to a three-dimensional image processing apparatus having at least part of the above-described means, an optical axis adjusting method using the apparatus, and an optical axis adjustment supporting method and program executed by the processor.

According to another aspect of the invention, there is provided an optical axis adjusting method of adjusting directions of optical axes of plural image capturing apparatuses, comprising the steps of: capturing an image of an object by the image capturing apparatuses; superimposing marks each indicative of optical center on the image; and adjusting the orientation of each of the image capturing apparatuses so that all of marks overlay the same point on the object by referring to the marks of the image capturing apparatuses.

According to further another aspect of the invention, there is provided an optical axis adjustment supporting method, wherein a processor to which plural image capturing apparatuses, a storage for storing optical center of an image captured by each of the image capturing apparatuses for each of the image capturing apparatuses, and a display are connected obtains images from the image capturing apparatuses, reads the optical center from the storage, and superimposes a mark indicative of the optical center on the image in order to support adjustment of the direction of the optical axis of each of the image capturing apparatuses.

According to further another aspect of the invention, there is provided a program for making a processor to which plural image capturing apparatuses, a storage for storing optical center of an image captured by each of the image capturing apparatuses for each of the image capturing apparatuses, and a display are connected execute a process of obtaining images from the image capturing apparatuses, reading the optical center from the storage, and superimposing a mark indicative of the optical center on the image in order to support adjustment of the direction of the optical axis of each of the image capturing apparatuses.

Thus, according to the present invention, even a person having no expert knowledge can adjust the directions of optical axes easily and with high precision.

BRIEF DESCRIPTION OF THE DRAWINGS

FIGS. 5A and 5B show diagrams showing a pattern chart used for an optical center calculating process and distortion of an image.

DESCRIPTION OF THE PREFERRED EMBODIMENTS

Preferred embodiments of the invention will be described in detail hereinbelow with reference to the drawings.

First Embodiment (Configuration of Three-Dimensional Image Processing Apparatus)

Figure 1:
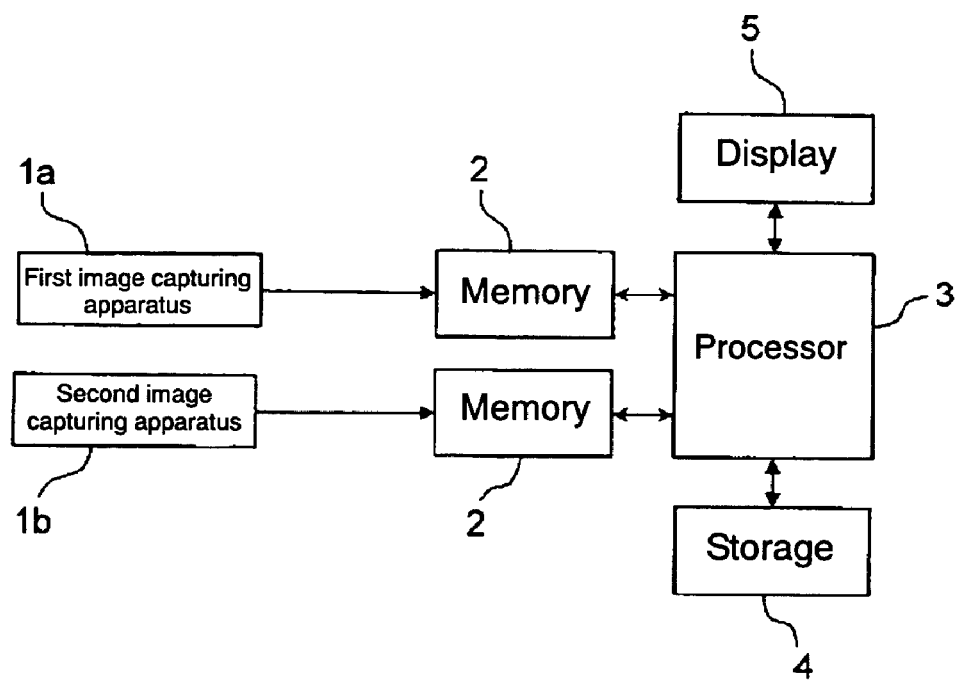
FIG. 1 shows a block diagram showing a hardware configuration of a three-dimensional image processing apparatus according to an embodiment of the present invention.

FIG. 1 shows a block diagram showing a hardware configuration of a three-dimensional image processing apparatus according to an embodiment of the present invention. The three-dimensional image processing apparatus includes, roughly, a first image capturing apparatus 1a, a second image capturing apparatus 1b, memories 2 and 2 for the image capturing apparatuses, a processor 3, a storage 4, and a display 5.

Each of the first and second image capturing apparatuses 1a and 1b (hereinbelow, also simply called "image capturing apparatus") is an image capturing apparatus having an optical system constructed by plural lenses and an image pickup device constructed by a CCD, a CMOS, or the like. Digital images captured by the image capturing apparatuses 1a and 1b are temporarily stored in the memories 2 and, after that, input to the processor 3. The images captured by the image capturing apparatuses 1a and 1b may be color images or monochromatic images. Specifications such as resolution may be properly selected according to an object of image capturing and the applications of the apparatuses.

The processor 3 is a computer constructed by a CPU (Central Processing Unit), a RAM, a ROM, an I/F, and the like and is a part for executing various computing processes, control processes, image processes and the like which will be described later in accordance with a program read from the ROM or the storage 4.

The storage 4 is a storage for storing digital data (including a program) and takes the form of, for example, a magnetic disk, a flash memory, an optical disk, a magnetooptic disk, or the like. The storage 4 stores not only a program executed by the processor 3 but also parameters referred to at the time of a stereo image process (such as the relative positional relations between the first and second image capturing apparatuses 1a and 1b), data referred to at the time of adjusting the directions of the optical axes (such as the optical center of an image), and the like.

The display 5 is a part for displaying display data generated by the processor 3. As a result of the stereo image process, images captured by the image capturing apparatuses 1a and 1b, an image for optical axis direction adjustment, and the like are output. In the embodiment, the processor 3 and the display 5 correspond to a display device of the invention.

(Adjustment of Optical Axis of Image Capturing Apparatus)

Figure 2:
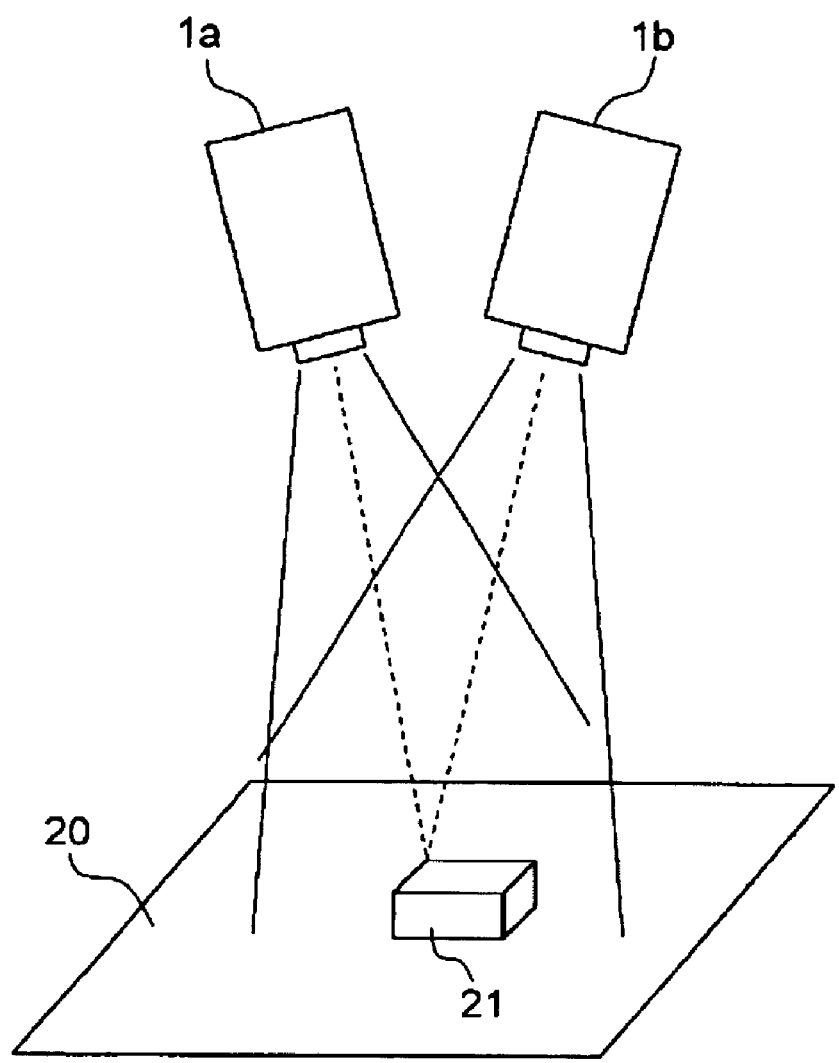
FIG. 2 shows a diagram showing a mounting example of image capturing apparatuses.

FIG. 2 shows a mounting example of the image capturing apparatuses 1a and 1b. As shown in FIG. 2, the two image capturing apparatuses 1a and 1b are mounted so as to be able to photograph an object 21 disposed on a reference plane 20 from different angles.

Each of the image capturing apparatuses 1a and 1b of the embodiment has a mechanism having 6 degrees of freedom, parallel movement of three axes of up/down, right/left, and forward/backward and rotational movement around the axes (by restricting some of the 6 degrees of freedom, the optical axis adjustment may be simplified). The direction of each of the image capturing apparatuses 1a and 1b (the direction of the optical axis) and the distance between the image capturing apparatus and the object are properly adjusted according to the application of the apparatus, the size and kind of the object 21, and the like prior to the stereo image process.

For example, when the three-dimensional image processing apparatus is applied to a tester for an industrial product (such as electronic part), since the object 21 is relatively small, each of the distance between the image capturing apparatuses and the distance between the image capturing apparatus and the object is desirably a dozen or so cm to tens cm. Due to the physical restrictions on mounting, to assure a common visual field, it becomes necessary to cross the optical axes of the two image capturing apparatuses 1a and 1b. In a test for an electronic part or the like, there is a case that test precision of the order of millimeters to the order of microns is requested. To realize such requested precision, the directions of the optical axes have to be strictly set.

Figure 3:
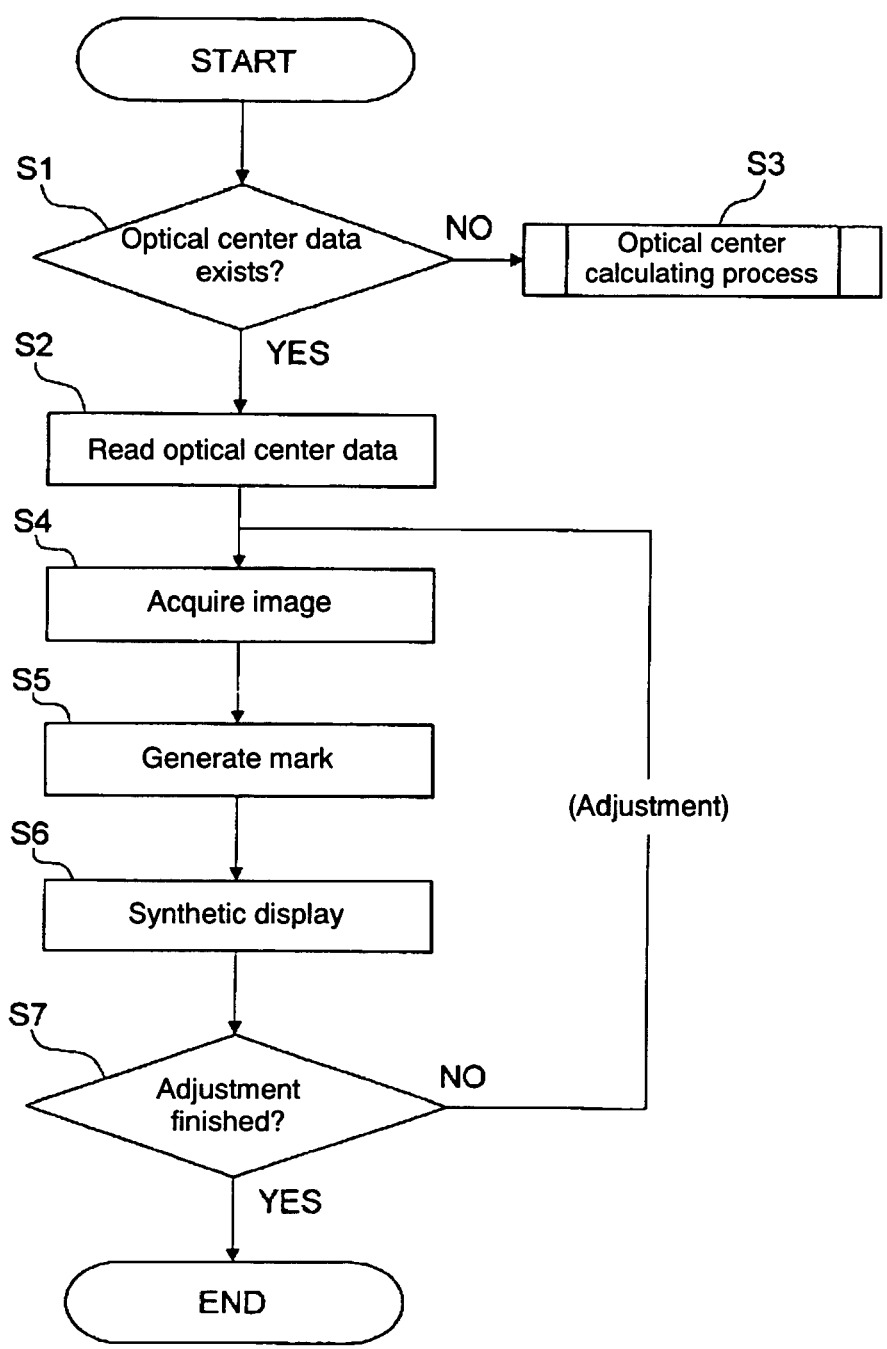
FIG. 3 shows a flowchart showing the flow of an optical axis adjusting process.

In the embodiment, the directions of the optical axes are adjusted by a method illustrated in FIG. 3.

When the apparatus is switched to an optical axis adjusting mode, the processor 3 starts the process of FIG. 3. First, the processor 3 checks whether data indicative of the optical center of an image of each of the image capturing apparatuses 1a and 1b is registered in the storage 4 or not. If it is registered (YES in step S1), the processor 3 reads the data (step S2).

The optical center data is data indicative of the coordinate value of a meeting point of the optical axis of each of the image capturing apparatuses 1a and 1b and the image pickup device. Both of the optical center data for the first image capturing apparatus 1a and that for the second image capturing apparatus 1b is registered. When the optical system of each of the image capturing apparatuses 1a and 1b has a zooming function, that is, when there are plural focal distances, the coordinate value at each of the focal distances is stored. When the optical center hardly changes even if the focal distance is changed, a single coordinate value may be stored.

Figures 4, 5:
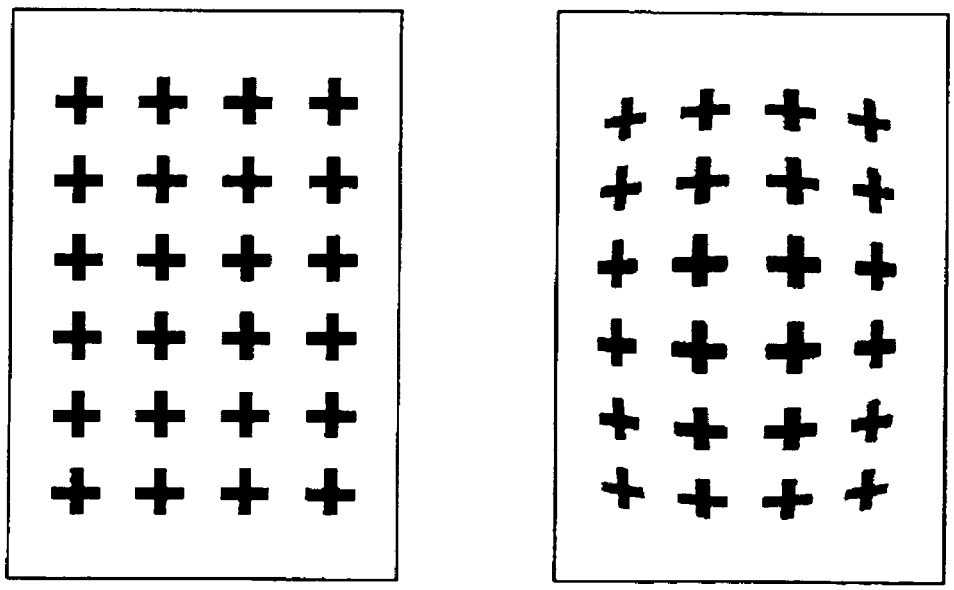
FIG. 4 shows a diagram showing an example of optical center data.

FIG. 4 shows an example of the optical center data in the embodiment. In the embodiment, coordinate values (x, y) on a pixel unit basis in a camera coordinate system (coordinate system on an image) at focal distances A to C are registered. By using the coordinate value in such a form, calculation of image synthesis in a post stage can be simplified.

When the optical center data is not registered yet (NO in step S1), the optical center is calculated as follows (step S3). When a pattern chart in a lattice shape shown in FIG. 5A is placed on the reference plane 20 and is photographed from the front by the image capturing apparatus, distortion occurs in the lattice on the image due to the influence of aberration of the optical system as shown in FIG. 5B. FIG. 5B exaggeratedly shows distortion of the lattice for explanation. As it is known that distortion of the lattice increases with distance from the optical axis, by analyzing a distortion amount at each of the points on the lattice, the position of the optical axis (the optical center of the image) can be obtained by reverse operation. By repeating the estimating process for each of the image capturing apparatuses and each of focal distances, the optical center data is generated. Various other methods for obtaining the optical center have been proposed and any of them may be employed.

The processor 3 obtains a first image captured by the first image capturing apparatus 1a from the memory 2 (step S4), selects a coordinate value corresponding to the focal distance of the first image capturing apparatus 1a from the optical center data for the first image capturing apparatus 1a read in step S2, and generates a mark to be displayed in the coordinates (step S5). Similarly, the processor 3 obtains a second image captured by the second image capturing apparatus 1b and generates a mark (steps S4 and S5).

Figure 6:
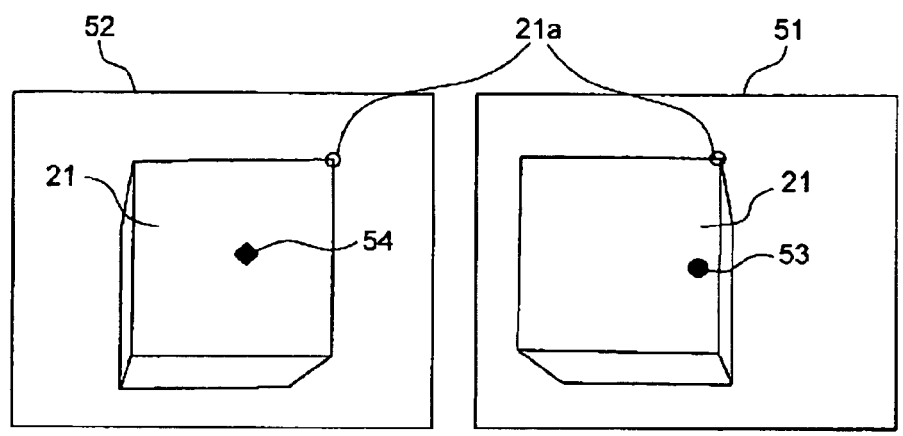
FIG. 6 shows a diagram showing an example of display of a mark in a first embodiment.

As shown in FIG. 6, a first image 51 and a second image 52 are displayed so as to be arranged in a line on the display 5, and marks 53 and 54 are superimposed on the images 51 and 52, respectively. In other words, in the embodiment, an image on which a mark is superimposed is displayed for each of the image capturing apparatuses 1a and 1b.

Preferably, the shape, color, and the like of the mark are easily identified by the user. For example, as illustrated in FIG. 6, a cursor of a circle shape or a polygonal shape may be displayed on the center coordinates, or a cross cursor having a cross at the center coordinates may be displayed. With respect to colors, the mark may be displayed in a conspicuous color such as a primary color or fluorescent color, or a color different from that of the reference plane 20 and the object 21, or displayed in an XOR mode on the image.

Each of those marks corresponds to a mark obtained by visualizing the optical axis. The user can visually grasp the direction of the optical axis of each of the image capturing apparatuses 1a and 1b by seeing an image and a mark displayed on the display 5 and intuitively grasp a deviation amount from a desired position, an adjustment direction, an adjustment amount, and the like. Each time the direction of any of the image capturing apparatuses 1a and 1b is moved, the processes in steps S4 to S6 are repeated (NO in step S7), and a display image on the display 5 is updated in a real-time manner, so that fine adjustment of the direction of the optical axis can be easily performed.

Figure 7:
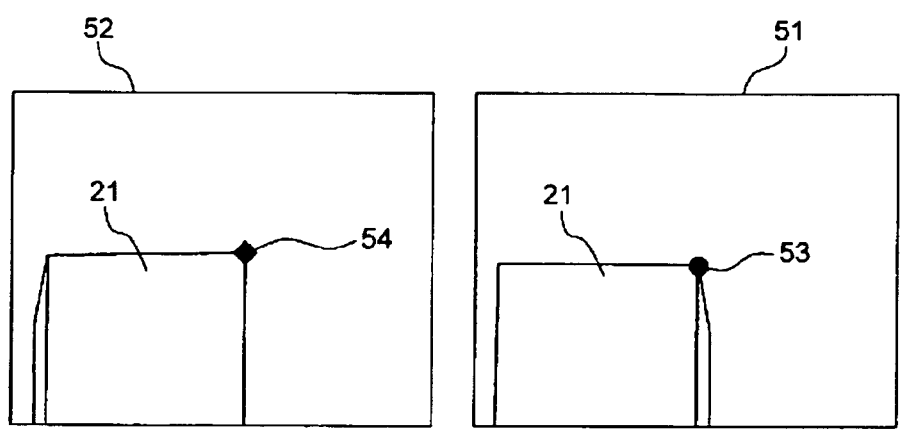
FIG. 7 shows a diagram illustrating a method of adjusting orientation of image capturing apparatuses.

For example, in the case of making the optical axes cross each other at a point 21a at the upper right corner of the object 21, adjustment may be performed as follows. First, while seeing the first image 51, the orientation of the first image capturing apparatus 1a is adjusted so that a mark 53 overlays the point 21a (the right image of FIG. 7). After that, while seeing the second image 52, the orientation of the second image capturing apparatus 1b is adjusted so that a mark 54 also overlays the point 21a (the left image of FIG. 7). When both of the marks overlay the same point 21a, the optical axis adjusting mode is finished (YES in step S7). In such a manner, crossing of the optical axes can be realized.

(Stereo Image Process)

After completion of the optical axis adjustment as described above, parameters indicative of the relation of the relative positions of the first and second image capturing apparatuses 1a and 1b are reset and it becomes ready for the stereo image process.

In a stereo image process mode, the processor 3 obtains images from the image capturing apparatuses 1a and 1b and obtains three-dimensional information of the object 21 on the basis of the correspondence relation of the image formation points of the object 21 in the images.

Figure 8:
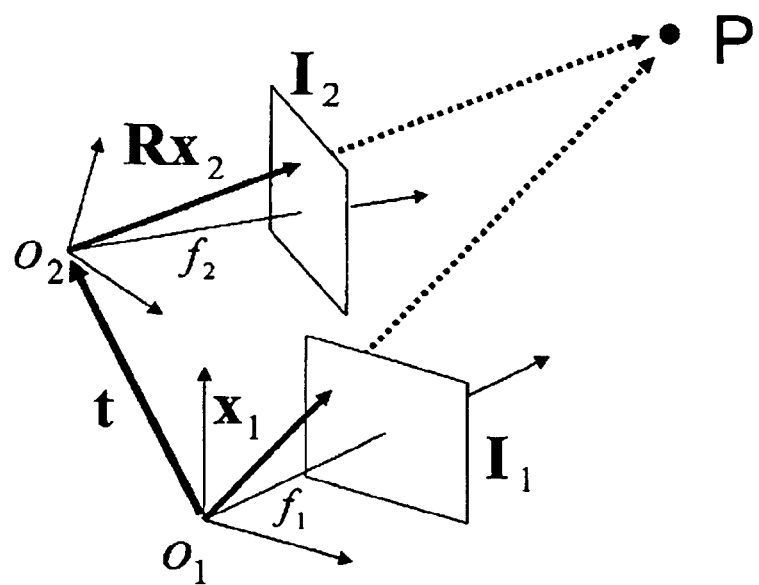
FIG. 8 shows a diagram showing the principle of a stereo image process.

The principle of the stereo image process will be described with reference to FIG. 8. In FIG. 8, the view point and the focal distance of the first image capturing apparatus 1a are indicated as O1 and f1, respectively. The view point and the focal distance of the second image capturing apparatus 1b are set as O2 and f2, respectively. When the camera coordinate system of the first image capturing apparatus 1a is used as a reference, the relative positional relation between the image capturing apparatuses 1a and 1b is described by a rotation matrix R and a translation vector t. When the vector of a projection point on an image I1 of the first image capturing apparatus 1a of a point P=(X, Y, Z) on the object 21 is set as x1 and the vector of a projection point on an image I2 of the second image capturing apparatus 1b of the point P is x2, three-dimensional information (depth distance Z) of the point P can be obtained by Equation 1.

$$Z = \frac{(t \times Rx_2, x_1 \times Rx_2)}{\|x_1 \times Rx_2\|^2} f_1 \qquad \text{Equation 1}$$

The three-dimensional information calculated in such a manner is output to the display 5 or subjected to other processes (such as image recognizing process, computing process, and inspecting process).

In the embodiment described above, the marks 53 and 54 indicative of the optical centers are superimposed on the images 51 and 52 obtained by the image capturing apparatuses 1a and 1b, so that even the user having no expert knowledge can easily adjust the directions of the optical axes with high precision.

Since the optical center data is prepared for each of the image capturing apparatuses and at each of focal distances, even if there are mount variations between the image pickup device and the optical system, high-precision adjustment can be performed.

Since display is performed for each of the image capturing apparatuses, the optical axis adjustment can be performed even in a state where the relative positional relation between the image capturing apparatuses 1a and 1b is not determined yet.

Further, the optical axes can be matched strictly, so that improvement in precision of the stereo image process and reduction in calculation cost can be achieved.

Second Embodiment

In a second embodiment of the present invention, a function of enlargedly displaying a portion including a mark is added. The other configuration is similar to that of the foregoing embodiment.

Figure 9:
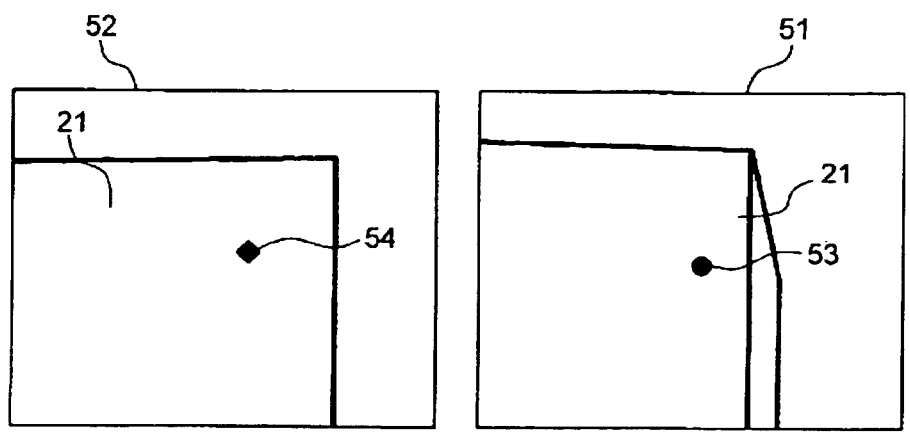
FIG. 9 shows a diagram showing an example of enlargement display in a second embodiment.

When an enlargement display function is executed in a state where the image of FIG. 6 is displayed on the display 5, the local areas around the marks 53 and 54 in the images 51 and 52 are enlargedly displayed (refer to FIG. 9). By the enlargement, the positioning between the marks and the points on the object 21 is facilitated and fine adjustment and matching of the optical axes can be performed with high precision.

In the case of digitally enlarging an image, it is sufficient to enlarge a local area in a display image by interpolation in the processor 3. In the case of optically enlarging an image, it is sufficient to increase the focal distance of the image capturing apparatuses 1a and 1b by sending a control signal from the processor 3. In this case, attention has to be paid that the focal distance before enlargement (focal distance at the time of executing the stereo image process) has to be used for calculating the display position of a mark.

Third Embodiment

In the case where the shape of an object is simple and easily recognized as shown in FIG. 6, the correspondence between the mark and the point on the object can be easily obtained. However, depending on the shape and pattern of an object, it is difficult to determine a point with which the mark is to be matched. There is a case that it is difficult to perform the optical axis adjustment by the method of the first embodiment.

In a third embodiment of the present invention, a function of superimposing marks of plural image capturing apparatuses on a single image is added. The other configuration is similar to that of the foregoing embodiments.

Figure 10:
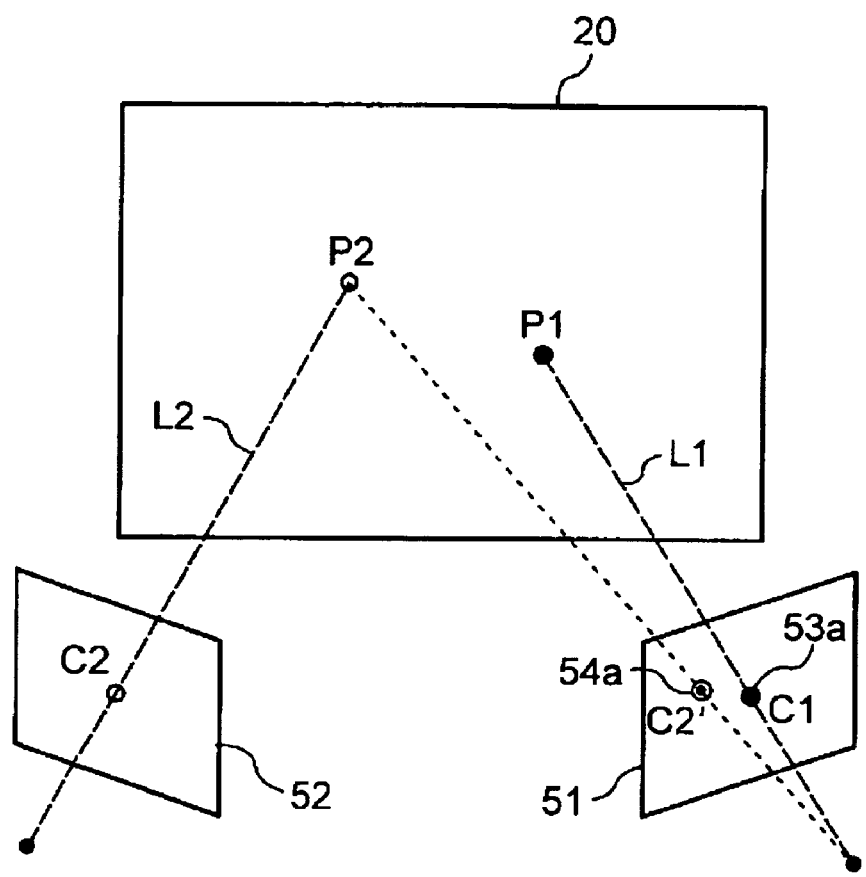
FIG. 10 shows a diagram showing the principle of optical axis adjustment in a third embodiment.

It is assumed that the image capturing apparatuses 1a and 1b and the reference plane 20 have the positional relations as shown in FIG. 10. In the diagram, a point C1 is the optical center of the first image 51, and a point C2 is the optical center of the second image 52. A point P1 is the meeting point of the optical axis L1 of the first image capturing apparatus 1a and the reference plane 20, and a point P2 is the meeting point of the optical axis L2 of the second image capturing apparatus 1b and the reference plane 20.

First, the processor 3 calculates a homography matrix H from the relative positional relations of the image capturing apparatuses 1a and 1b and the reference plane 20. The homography matrix H is a transformation matrix for projecting an arbitrary point x2 on the second image 52 to a point x1 on the first image 51 via the reference plane 20 as shown by Equation 2. When the relative positional relations among the image capturing apparatuses 1a and 1b and the reference plane 20 are unknown, they may be calculated by extracting some image points on the reference plane 20 from the images captured by the image capturing apparatuses 1a and 1b.

[Equation 2]

$$x_1 = Hx_2 \text{tm} \qquad \text{Equation 2}$$

The processor 3 calculates the coordinates of a projection point C2' on the first image 51 by transforming the coordinates of the point C2 by using Equation 2, and displays a second mark 54a in the position of the point C2'. That is, the second mark 54a is displayed at the corresponding point (C2') of the image (point P2) in the optical center (point C2) of the second image 52. In the position of the point C1 of the first image 51, a first mark 53a is superimposed.

Although a mark has to be matched with the same point on an object in each of images in the first embodiment, in the third embodiment, it is sufficient to adjust the orientations of the image capturing apparatuses 1a and 1b so that the first mark 53a and the second mark 54a overlap each other on the first image 51 irrespective of the object. Therefore, the optical axis adjustment can be performed more easily.

To make the relation between a mark and an image capturing apparatus grasped more easily, preferably, the first and second marks 53a and 54a have different colors or different shapes, or text information indicative of correspondence with the image capturing apparatuses such as "1" and "2" is displayed near the marks.

Further, it is preferable to display text information indicative of the difference of positions of the first and second marks 53a and 54a. For example, when the distance (deviation amount) between two marks on an image is displayed by the number of pixels in each of the vertical and horizontal directions, it is sufficient for the user to adjust the orientations of the image capturing apparatuses so that the value becomes zero while watching the display. Alternately, an adjustment direction and an adjustment amount of the image capturing apparatus from the deviation amount are displayed. They are information useful for the optical axis adjustment.

Fourth Embodiment

A fourth embodiment of the present invention will now be described. Also in the fourth embodiment, in a manner similar to the third embodiment, marks of plural image capturing apparatuses are superimposed on a single image. In the third embodiment, the second mark indicates the corresponding point C2' of the point P2. The fourth embodiment is different from the third embodiment with respect to the point that the second mark indicates an epipolar line which is projection of the optical axis of the second image capturing apparatus 1b onto the first image 51.

In the method of the third embodiment, the cross point of the optical axes L1 and L2 (the point at which the optical axes cross each other) is always set on the reference plane 20. Depending on the application of the apparatus and the kind of an object, however, there is a case that the cross point is desired to be set on an object, not on the reference plane 20. The fourth embodiment relates to the method useful in such a case.

Figure 11:
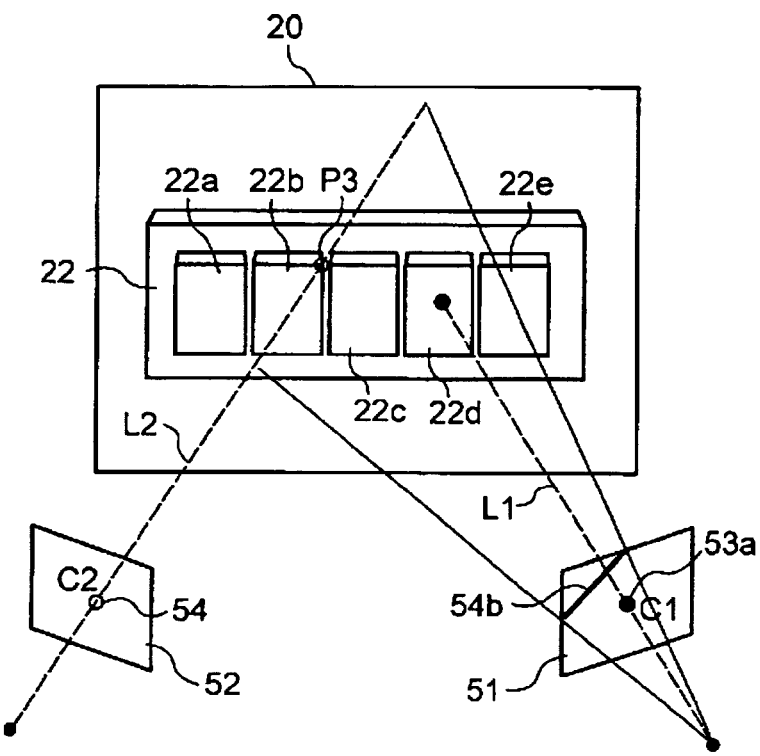
FIG. 11 shows a diagram showing the principle of optical axis adjustment in a fourth embodiment.

A method of placing an object (electronic circuit 22) on the reference plane 20 and setting a cross point at the point P3 on the object as shown in FIG. 11 will be described. Plural chips 22a to 22e are mounted on the electronic circuit 22, and the point P3 assumes the point at the right upper corner of the chip 22b.

Figure 12:
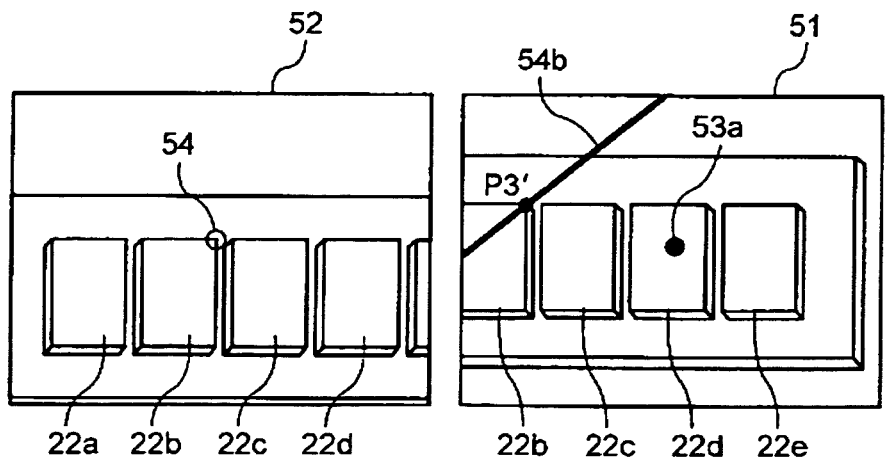
FIG. 12 shows a diagram showing an example of display of a mark in the fourth embodiment.
Figure 13:
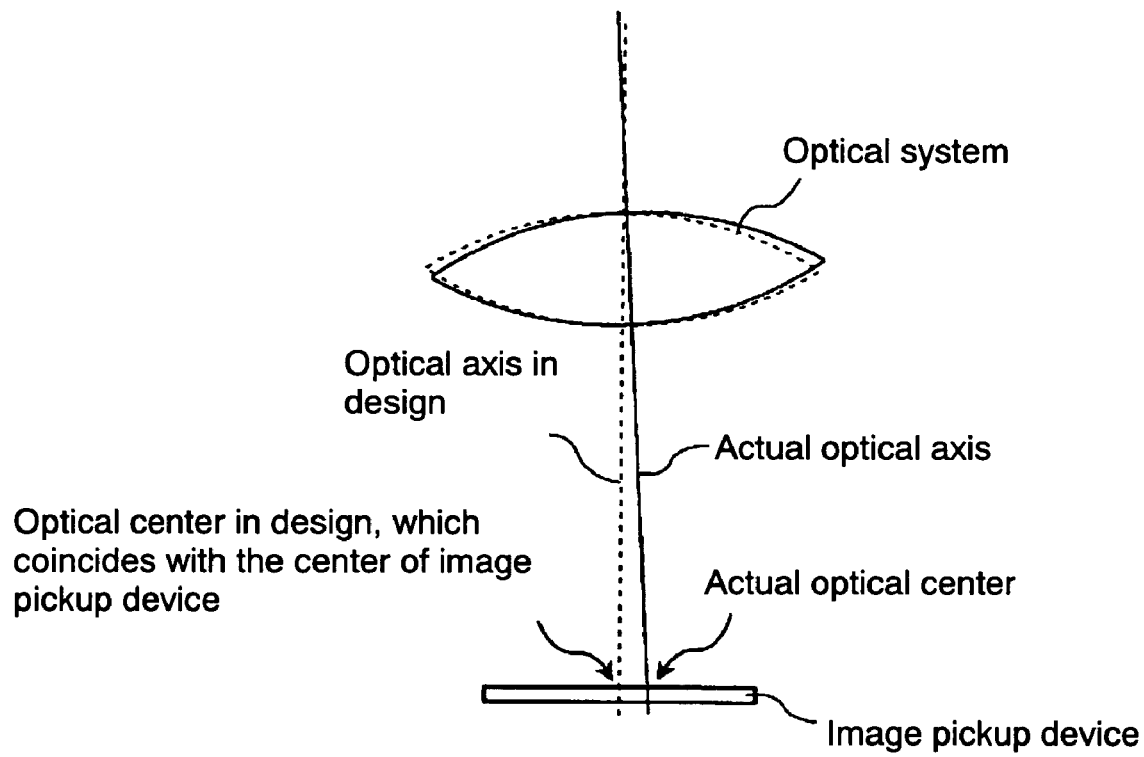
FIG. 13 shows a diagram showing mount variations in an image pickup device and an optical system.

First, with reference to the second image 52, the orientation of the second image capturing apparatus 1b is adjusted so that the mark 54 overlays the point P3. The second image 52 at this time is the left image in FIG. 12.

Since the distance between the image capturing apparatus 1a and 1b and the reference plane 20 is known in the third embodiment, the projection point onto the first image 51 can be calculated. In the example of FIG. 11, the height of the point P3 (the distance between the image capturing apparatus 1a and 1b and the point P3) is unknown, so that the projection point cannot be calculated. That is, although it is understood that the point P lies on the optical axis L2, the position of the point P on the optical axis L2 cannot be specified.

The processor 3 calculates a fundamental matrix F from the relative positional relation between the image capturing apparatuses 1a and 1b. The fundamental matrix F indicates an epipolar constraint between the point x1 on the first image 51 and the point x2 on the second image 52 as shown by Equation 3.

[Equation 3]

$$(x_1, Fx_2) = 0 \quad \text{Equation 3}$$

The processor 3 substitutes the coordinates of the point C2 for Equation 3, thereby obtaining Equation 4. Equation 4 indicates an epipolar line when the optical axis L2 of the second image capturing apparatus 1b is projected onto the first image 51.

[Equation 4]

$$(x_1, Fc_2) = 0 \quad \text{Equation 4}$$

The processor 3 generates the linear second mark 54b from Equation 4 and superimposes it on the first image 51. The first image 51 at this time is as shown by the right image in FIG. 12. The second mark 54b is a straight line passing the image point P3' of the point P3.

By adjusting the orientation of the first image capturing apparatus 1a so that the first mark 53a overlays the second mark 54b by referring to the first image 51, the crossing of the optical axes L1 and L2 can be realized. Further, by matching the first mark 53a with the image point P3', the cross point can be set on the point P3 of the electronic circuit 22.

In an image where a similar pattern appears repeatedly like the electronic circuits 22, it is not easy to determine which part in the object is displayed. Therefore, in the case of performing adjustment while watching only the image of the object as in the first embodiment, it may take time to find the image point P3' of the point P3, and an erroneous operation of detecting the corner of the next chip 22c as the image point P3' may be performed.

In the fourth embodiment, it is known in advance that the image point P3' exists on the second mark 54b. Consequently, the point with which the first mark 53a is to be matched can be specified easily and accurately.

Although a concrete example of the present invention has been described above by the first to fourth embodiments, the scope of the invention is not limited to the foregoing embodiments but the invention can be variously modified within the technical idea of the invention.

For example, the foregoing embodiments may be combined. Although the orientation of the image capturing apparatus is adjusted manually in the foregoing embodiments, the processor may drive a motor or the like on the basis of information of an image and a mark to automatically adjust the orientation of the image capturing apparatus. The number of image capturing apparatuses may be larger than two. The three-dimensional image processing apparatus of the present invention can be also used for not only a tester but also various applications such as a three-dimensional measuring apparatus, computer vision, and the like.

What is claimed is:

1. A three-dimensional image processing apparatus for obtaining three-dimensional information of an object from plural images, comprising:
   plural image captunng apparatuses;
   a calculating apparatus for calculating an optical center of an image captured by each of the plural image capturing apparatuses;
   a storage for storing the optical center of an image calculated by the calculating apparatus; and
   a display for displaying marks indicative of the optical center stored by the storage so as to be superimposed on an image captured by an image capturing apparatus.

2. The three-dimensional image processing apparatus according to claim 1, wherein the image capturing apparatus has plural focal distances, and the storage stores optical center of an image at each of the focal distances.

3. The three-dimensional image processing apparatus according to claim 1, wherein the display enlargedly displays a part including the mark.

4. The three-dimensional image processing apparatus according to claim 1, wherein the display displays for each image capturing apparatus the image on which a mark for said image capturing apparatus is superimposed.

5. The three-dimensional image processing apparatus according to claim 1, wherein the display superimposes marks of plural image capturing apparatuses on a single image.

6. The three-dimensional image processing apparatus according to claim 5, wherein the display superimposes, on a first image obtained from a first image capturing apparatus, a first mark indicative of optical center of the first image and a second mark indicative of information that an optical center of a second image obtained from a second image capturing apparatus is projected onto the first image.

7. The three-dimensional image processing apparatus according to claim 6, wherein the second mark indicates a correspondence point of an image in the optical center of the second image.

8. The three-dimensional image processing apparatus according to claim 6, wherein the second mark indicates an epipolar line of the optical axis of the second image capturing apparatus, projected onto the first image.

9. The three-dimensional image processing apparatus according to claim 6, wherein the display displays the difference between the positions of the first and second marks.

10. An optical axis adjusting method of adjusting directions of optical axes of plural image capturing apparatuses, comprising the steps of:

having each image capturing apparatus, capturing an image of an object, calculating an optical center of the image captured by the image capturing apparatus.

superimposing marks each indicative of the optical center on the image; and adjusting the orientation of each of the image capturing apparatuses so that all of marks overlay the same point on the object by referring to the marks of the image capturing apparatuses.

11. An optical axis adjustment supporting method, wherein a processor to which plural image capturing apparatuses, a storage for storing an optical center of an image captured by each of the image capturing apparatuses for each of the image capturing apparatuses, and a display are connected, the method comprising obtaining images from the image capturing apparatuses, calculating the optical center of the image captured by each of the image capturing apparatuses, reading the optical center from the storage, and superimposing a mark indicative of the optical center on the image in order to support adjustment of the direction of the optical axis of each of the image capturing apparatuses.

* * * * *

UNITED STATES PATENT AND TRADEMARK OFFICE
CERTIFICATE OF CORRECTION

PATENT NO.        : 7,409,152 B2  
APPLICATION NO.  : 11/167944  
DATED            : August 5, 2008  
INVENTOR(S)      : Masaki Suwa Page 1 of 1

It is certified that error appears in the above-identified patent and that said Letters Patent is hereby corrected as shown below:

In the Claims:

In Claim 1, column 10, line 42, the word "captunng" should be --capturing--.

In Claim 2, column 10, line 53, after the word "stores" the word --an-- is missing.

In Claim 6, column 11, line 2, before the word "optical" the word --an-- is missing.

Signed and Sealed this

Seventh Day of October, 2008

JON W. DUDAS  
*Director of the United States Patent and Trademark Office*